United States Patent [19]
Shirai

[11] Patent Number: 6,072,642
[45] Date of Patent: Jun. 6, 2000

[54] FOCUSING LENS POSITION DETECTION APPARATUS AND AN AUTO-FOCUS SURVEYING APPARATUS

[75] Inventor: Masami Shirai, Saitama, Japan

[73] Assignee: Asahi Kogaku Kogyo Kabushiki Kaisha, Tokyo, Japan

[21] Appl. No.: 09/330,020

[22] Filed: Jun. 11, 1999

[30] Foreign Application Priority Data

Jun. 11, 1998 [JP] Japan .................................. 10-163937

[51] Int. Cl.[7] .................................................. G02B 7/02
[52] U.S. Cl. ............................................................ 359/823
[58] Field of Search ..................................... 359/618, 629, 359/694, 822, 823, 425, 426; 356/918; 250/201.2, 201.4

[56] References Cited

U.S. PATENT DOCUMENTS

| | | | |
|---|---|---|---|
| 4,459,004 | 7/1984 | Morizumi | 396/106 |
| 5,715,101 | 2/1998 | Nakamura et al. | 359/823 |
| 5,796,517 | 8/1998 | Sensui et al. | 359/426 |
| 5,844,231 | 12/1998 | Suzuki et al. | 250/201.2 |
| 5,856,663 | 1/1999 | Suzuki et al. | 250/201.2 |
| 5,856,664 | 1/1999 | Suzuki et al. | 250/201.2 |
| 5,872,661 | 2/1999 | Suzuki et al. | 359/698 |
| 5,877,892 | 3/1999 | Nakamura et al. | 359/426 |
| 5,886,340 | 3/1999 | Suzuki et al. | 250/201.7 |
| 5,936,736 | 8/1999 | Suzuki et al. | 356/375 |

*Primary Examiner*—Ricky Mack
*Attorney, Agent, or Firm*—Greenblum & Bernstein, P.L.C.

[57] ABSTRACT

Disclosed is a focusing lens position detection apparatus provided in an auto-focus surveying instrument that includes a telescopic optical system having a focusing lens which moves along an optical axis, a beam splitter which splits object light transmitted through the focusing lens to produce light split from the telescopic optical system, and a focus detector which receives the split light from the beam splitter. The focusing lens position detection apparatus includes: an indicia member provided on the focusing lens, which is located outside the light path of the telescopic optical system; and a light path changing member provided between the beam splitter and the focus detector, which is movable between a first position in which the split beam from the beam splitter can be received by the focus detector and a second position; wherein the light from the indicia member can be received by the focus detector.

16 Claims, 9 Drawing Sheets

Fig. 3
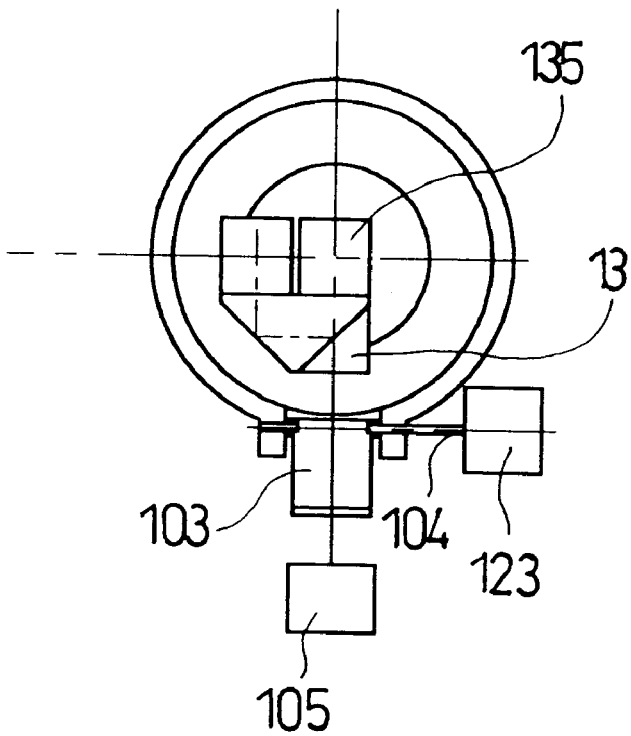
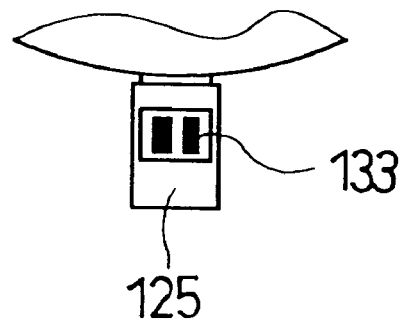
Fig. 5

FOCUSING LENS POSITION DETECTION APPARATUS AND AN AUTO-FOCUS SURVEYING APPARATUS

BACKGROUND OF THE INVENTION

1. Field of the Invention

The present invention relates to an apparatus for detecting the position of a focusing lens (group) in an auto-focus surveying instrument, such as a total station.

2. Description of the Related Art

In a conventional auto-focus type surveying instrument having a collimating telescope, such as a total station, a light path of a focus detection optical system is split from a light path of the collimating telescope by means of a beam splitting optical system, wherein the focus state on a plane optically equivalent to a focal plane of the telescopic optical system is detected by a phase difference automatic-focus detector having a pair of CCD sensors to calculate the amount of defocus, so that the focusing lens group can be moved to an in-focus position based on the defocus amount. The principle of the phase difference AF device is well known and has been employed in AF single lens reflex cameras.

However, depending on the object (targeted object) by which the collimating operation is being applied, some automatic focus detectors cannot perform a precise auto-focusing operation. For example, if the targeted object is a prism which is used for a distance measuring operation, the auto-focus surveying instrument is focused on its own image formed on the prism, the position thereof determined as being further away from the actual position of the prism. To prevent this, it is theoretically possible to carry out the automatic focusing operation of the collimating telescope based on measurements (object distance values) obtained using a distance measuring function of the surveying instrument. In this solution, the distance of the targeted object must be correlated with the position of the focusing lens group at which the targeted object is in focus. Accordingly, it is necessary to provide a detection mechanism which detects an absolute position of the focusing lens group.

Moreover, when putting up a pole at a predetermined position in a pole staking operation, it is advisable to focus the optical system of the collimating telescope at a preset position. Accordingly, likewise with the above mentioned situation, the focusing lens group position detection mechanism is necessary.

However, in the detection of the position of the focusing lens group, an encoder which is directly connected to a focusing lens group driving motor detects the amount of rotation of the driving motor, so that the displacement of the focusing lens group can be determined in accordance with the amount of rotation thus obtained. Therefore, if the direction of the movement of the focusing lens group is reversed, detection of the absolute position of the focusing lens group cannot be carried out due to backlash of a driving gear train which transmits the rotation of the driving motor to the focusing lens group. Therefore, to move the focusing lens group to an in-focus position, it is always necessary to pass the focusing lens group through a predetermined reference position and move the same from the reference position without reversing. Such movement of the focusing lens requires a long time for the focusing operation, thus resulting in a reduced operation efficiency.

It is theoretically possible to detect the position of the focusing lens group without having influence from backlash which occurs in the driving gear train, using an optical linear encoder. However, an optical linear encoder is large and expensive.

SUMMARY OF THE INVENTION

An object of the present invention is to provide a focusing lens (group) position detection apparatus which can be advantageously applied to an auto-focus surveying instrument, such as a total station, wherein the focusing operation can be precisely carried out within a short space of time, thus leading to an improved operation efficiency.

According to an aspect of the present invention, there is provided a focusing lens position detection apparatus provided in an auto-focus surveying instrument that includes a telescopic optical system having a focusing lens which moves along an optical axis, a beam splitting element which splits object light transmitted through the focusing lens to produce light split from the telescopic optical system, and a focus detection device for receiving the split light from the beam splitting element, the focusing lens position detection apparatus including: an indicia member provided on the focusing lens, which is located outside the light path of the telescopic optical system; a light path changing member provided between the beam splitting element and the focus detection device; and a moving device which moves the light path changing member between a first position in which the split beam from the beam splitting element can be received by the focus detection device, and a second position in which the light from the indicia member can be received by the focus detection device.

With this arrangement, light carrying an object, to be detected by the focus detection device, can be switched between light from the telescopic optical system and light which is used to detect the position of the focusing lens, in accordance with the movement of the light path changing member. Namely, the focus detection device which has been adapted to receive light from the telescopic optical system is also used to detect the position of the focusing lens, and thus, the focusing lens position detection apparatus of the present invention can be made smaller and simpler than a conventional apparatus using an optical linear encoder. Moreover, since it is not necessary to detect the position of the focusing lens, based on the amount of rotation of the motor, the focusing operation can be carried out within an extremely short space of time.

Preferably, the light path changing member includes a reflection surface; wherein a light path from the beam splitting element to the focus detection device is established at the first position of the light path changing member; and wherein the light path from the beam splitting element to the focus detection device is interrupted at the second position of the light path changing member so that the light from the indicia member is reflected by the reflection surface and received by the focus detection device.

In an embodiment, the light path changing member is rotatable about a shaft provided at one end thereof to move between the first and second positions.

In an embodiment, the amount of defocus of the telescopic optical system is detected by the focus detection device when the light path changing member is in the first position.

A distance determination device can be provided for determining the distance between the indicia member and the focus detection device in accordance with the detection result of the focus detection device, when the light path changing member is in the second position. Namely, the light path changing member is held in the first position if the normal automatic focusing operation can be utilized, so that the focusing operation can be carried out, in accordance with the amount of defocus which is detected through the telescopic optical system. If it is difficult to detect the amount of defocus or if the distance of the targeted object is manually set, the light path changing member is moved to the second position, so that the focus detection device can be adapted to detect the position of the focusing lens group.

The distance of a targeted object and the distance between the indicia member and the focus detection device when the focusing lens is placed in the in-focus position for the targeted object are correlated.

If the correlation between the two distances (the distance of the targeted object and the distance from the indicia member to the focus detection device) is stored in a memory, the distance for which the focusing lens is focused can be easily judged with reference to the distance between the indicia member and the focus detection device, detected via the focus detection device. Alternatively, it is possible to provide a calculation device for determining the distance between the indicia member and the focus detection device which corresponds to the in-focus position of the focusing lens for focusing on the targeted object, based on the distance of the targeted object.

With the above arrangement, it is possible to move the focusing lens to the in-focus position by a lens moving device, based on the difference between the current distance from the indicia member to the focus detection device which is determined via the detection result of the focus detection device, and the distance from the indicia member to the focus detection device which corresponds to the infocus position of the focusing lens for focusing on the targeted object.

In case that the indicia member is positioned far from the light path changing member (the focus detection device) it is preferable that an optical element be provided between the indicia member and the light path changing member, for forming an image of an indicia of the indicia member. The optical element can be made, for example, of a relay lens.

In general, the periphery of the optical system (focusing lens) is optically sealed, and hence, it is preferable to provide a lighting device for illuminating the indicia member. The lighting device can be located on the side opposite to the light path changing member with respect to the indicia member and in the vicinity of the latter. The indicia member is preferably transparent. Preferably, the lighting device is activated to irradiate illumination light, only when the light path changing member is in the second position in which the light from the indicia member can be received by the focus detection device.

According to another aspect of the present invention, there is provided an auto-focus surveying apparatus including: a telescopic optical system having a focusing lens which moves along an optical axis; a beam splitting element which splits object light transmitted through the focusing lens to produce light split from the telescopic optical system; a focus detection device, which receives the split light from the beam splitting element and detects the amount of defocus of the telescopic optical system; an object-distance determining device, which obtains the distance of a targeted object; a lens moving device for moving the focusing lens; an indicia member provided on the focusing lens, which is located outside the light path of the telescopic optical system; a light path changing member provided between the beam splitting element and the focus detection device, which is movable between a first position in which the split beam from the beam splitting element can be received by the focus detection device so as to detect the amount of defocus of the telescopic optical system, and a second position in which the light from the indicia member can be received by the focus detection device; a distance determination device for determining the distance between the indicia member and the focus detection device in accordance with the detection result of the focus detection device, when the light from the indicia member is received by the focus detection device; and a controller that controls the lens moving device so as to move the focusing lens to the in-focus position, in accordance with the amount of defocus of the telescopic optical system when the light path changing member is in the first position, and in accordance with the relationship between the targeted-object distance and the distance from the indicia member to the focus detection device when the light path changing member is in the second position.

The present disclosure relates to subject matter contained in Japanese Patent Application No. 10-163937 (filed on Jun. 11, 1998) which is expressly incorporated herein by reference in its entirety.

BRIEF DESCRIPTION OF THE DRAWINGS

The present invention will be described below in detail with reference to the accompanying drawings in which:

FIG. 3 is a sectional view taken along the line III—III in FIG. 1;

FIG. 5 is an enlarged end view of an indicia plate, viewed from an arrow IV shown in FIG. 1;

DESCRIPTION OF THE PREFERRED EMBODIMENTS

Figure 1:
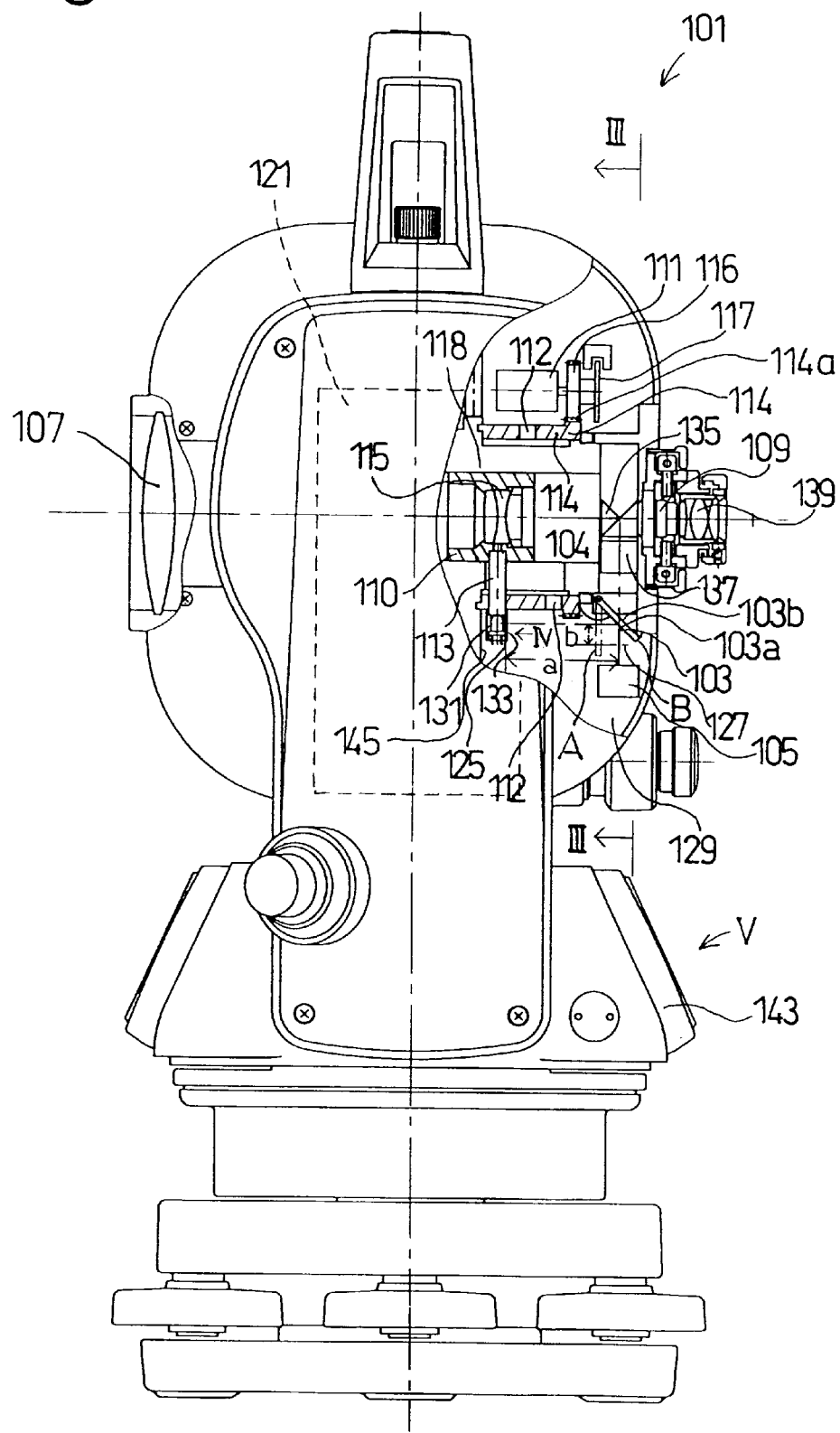
FIG. 1 is a partial sectional view of an auto-focus total station for a surveying instrument to which the present invention is applied.
Figure 2:
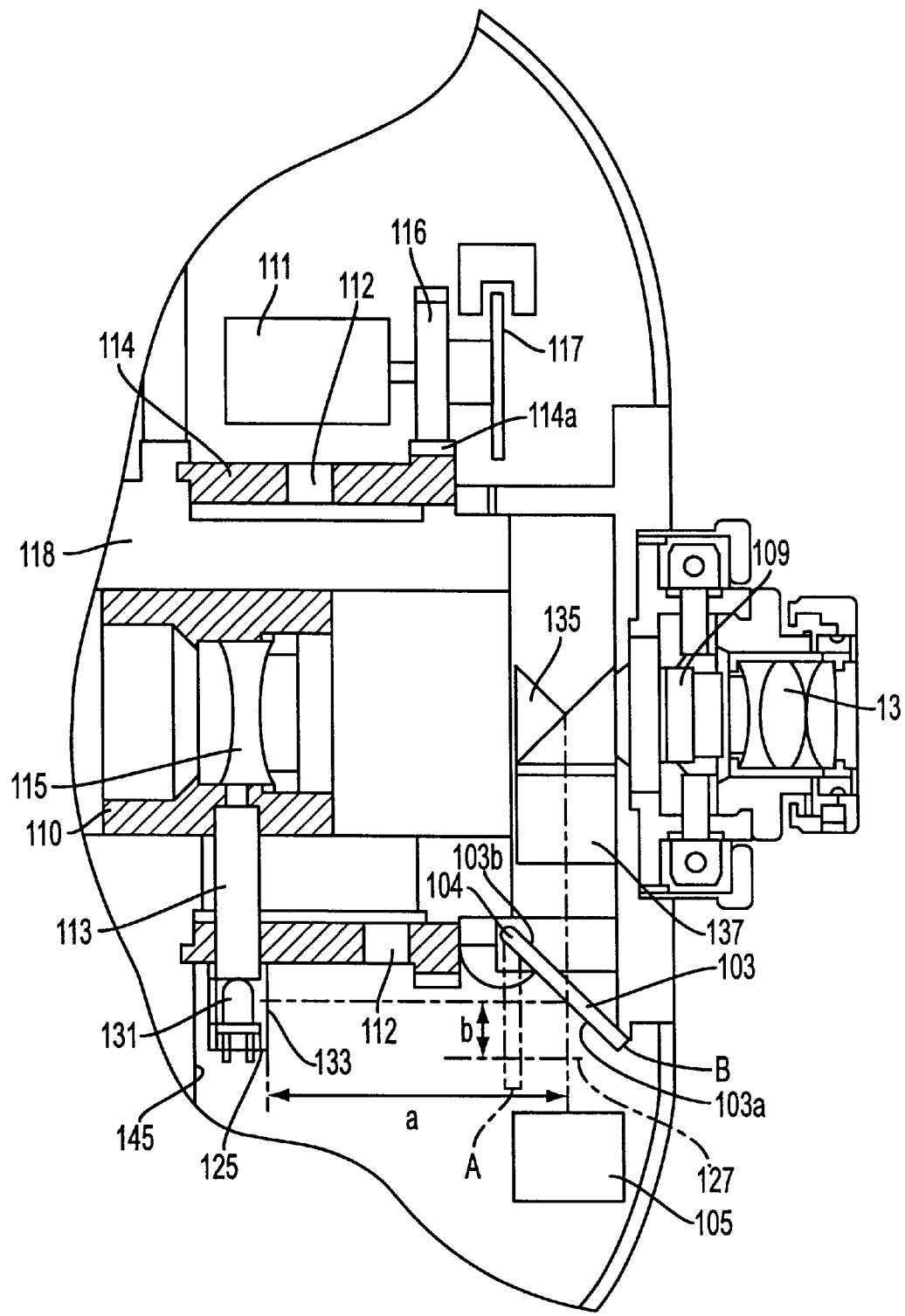
FIG. 2 is an enlarged view of a portion of the auto-focus total station shown in FIG. 1.
Figure 4:
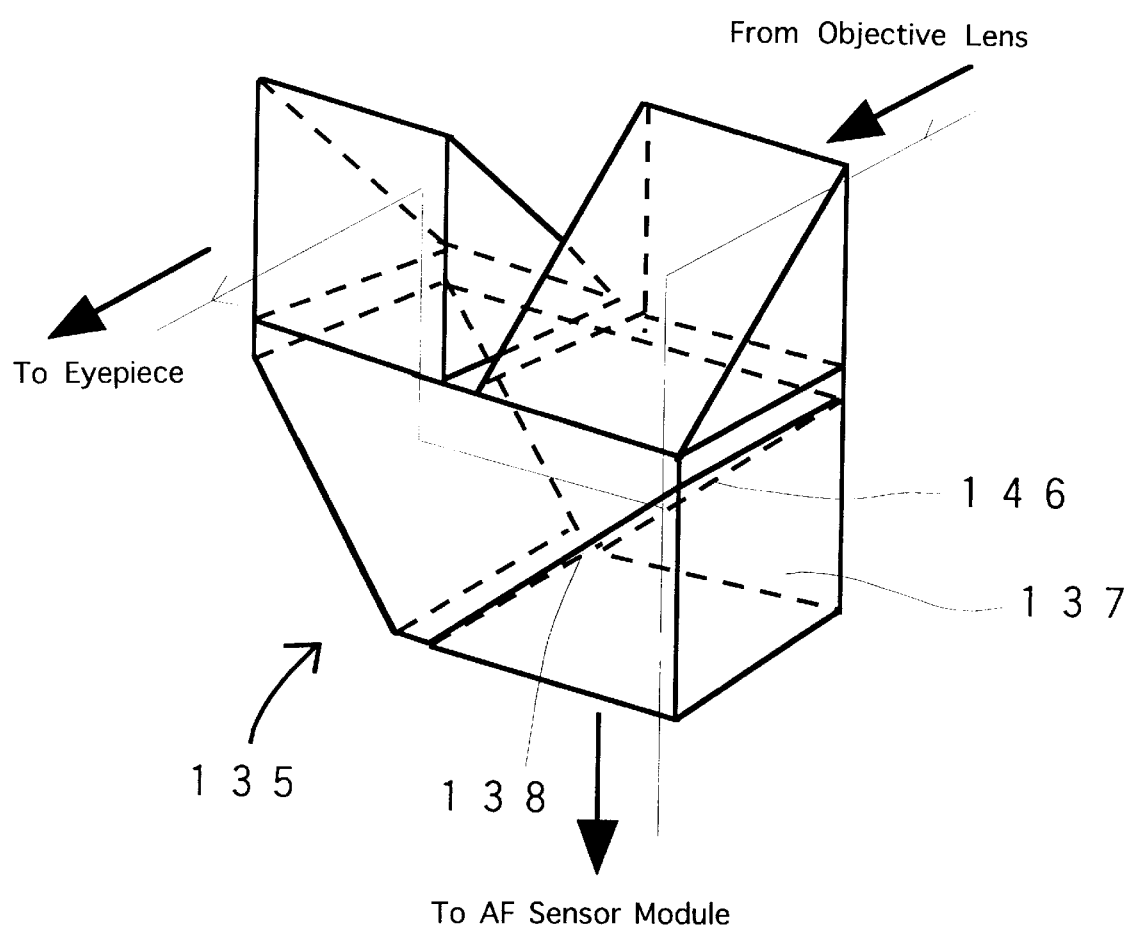
FIG. 4 is a perspective view of a Porro prism in the auto-focus total station shown in FIG. 1.
Figure 6:
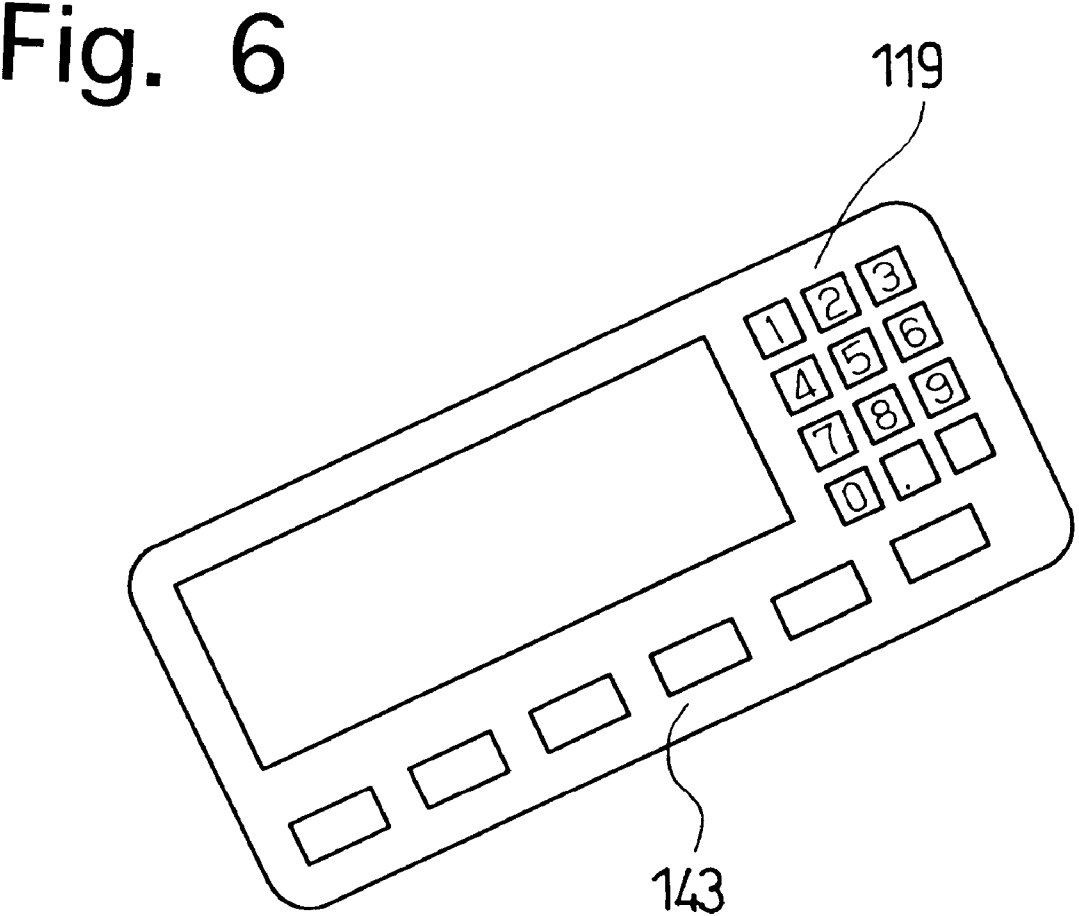
FIG. 6 is a front elevational view of a keyboard, viewed from an arrow V in FIG. 1.

Embodiments of the present invention will be discussed below, referring to the drawings. FIG. 1 shows a partially sectioned side view of a total station 101 having an auto-focus device, as a surveying instrument, according to an embodiment of the present invention. FIG. 2 shows an enlarged view of a portion of FIG. 1. FIG. 3 is a partially sectioned side view of an auto-focus total station 101, viewed from the direction of an arrow III in FIG. 1. FIG. 6 is a front elevational view of a keyboard 143, as viewed from the direction of an arrow V in FIG. 1.

The total station 101 includes a telescopic optical system and a focus detection optical system. The telescopic optical system includes an objective lens 107, a focusing lens group 115, a Porro prism 135, a focusing plate 109, and an eyepiece 139. An image formed on the focusing plate 109 through the objective lens 107, the focusing lens group 115 and the Porro prism 135 can be viewed through the eyepiece 139. The focus detection optical system includes a prism 137, and an AF sensor module 105 (focus detection device) which detects the focus state on a reference focal plane 127 which is optically equivalent to the focusing plate 109. The prism 137 is in close contact with a second reflection surface 146 of the Porro prism 135, so that the boundary surface defines a splitting surface (coated surface) 138 of the beam splitting element. A beam splitting coating is provided on the splitting surface 138. Note that although the prism 137 is in close contact with the second reflection surface of the Porro prism 135 in the illustrated embodiment, it is possible to attach the prism 137 to another reflection surface. Alternatively, it is also possible to make the beam splitting element of a beam splitter separate from the Porro prism.

The AF sensor module 105 which detects the focus state on the reference focal plane 127 is a phase difference detecting system and includes a condenser lens, a pair of separator lenses, and a pair of CCD sensors. These elements are arranged in this order from the reference focal plane 127 side. A positional deviation of an image surface of a real image from the reference focal plane 127, i.e., the amount of defocus is detected based on the position or distance of the object images formed on the pair of CCD sensors.

The focusing lens group 115 is secured to a cylindrical lens holder ring 110 which is fitted in a stationary barrel 118 to slide in the optical axis direction. The stationary barrel 118 is fitted in a cam ring 114 which is rotatable about the optical axis but not movable in the axial direction. As shown in FIG. 1, above the stationary lens barrel 118, a drive motor 111 and an encoder unit 117 which detects the amount of rotation of the drive motor 111 are provided. The drive motor 111 is provided with a drive shaft having a gear 116 secured thereto, which is in mesh with a gear 114a formed on the outer peripheral surface of the end of the cam ring 114. When the drive motor 111 rotates, the cam ring 114 rotates about the optical axis. The lens holder ring 110 is provided on its lower portion with a pin 113 secured thereto, which extends through a lead groove formed on the stationary barrel 118 and a cam groove 112 of the cam ring 114. Further, an indicia plate (indicia member) 125 is secured to the end portion of the pin 113 which extends through the cam ring 114. Consequently, when the cam ring 114 is rotated by the drive motor 111, the focusing lens group 115, the pin 113 and the indicia plate 125 are moved simultaneously in the optical axis direction.

In the focus detection optical system, a reflection mirror (light path changing member) 103 is provided between the prism 137 and the reference focal plane 127, with the reflection surface 103a facing in the left direction in FIG. 1. The mirror 103 is rotatable about a shaft 104 between a focus detection position "A" and an indicia detection position "B" as shown in FIG. 1. In the focus detection position "A", the mirror 103 is retracted from the light path extending from the prism 137 to the AF sensor module 105. In other words, the focus detection position "A" refers to a position in which the light path from the prism 137 to the AF sensor module 105 is established. The focus detection position "B" refers to a position in which the light from the indicia plate 125 is reflected by the reflection surface 103a of the reflection mirror 103 and is made incident upon the AF sensor module 105. The shaft 104 of the reflection mirror 103 is connected at one end thereof with a rotary solenoid 123 (moving device for moving the light path changing member) which is adapted to rotate the reflection mirror 103 (FIG. 3).

The indicia plate 125 is provided with a chart 133 as shown in FIG. 5. As shown in FIG. 1, the indicia plate 125 is arranged so that when the reflection mirror 103 is in the indicia detection position "B", the light from the indicia plate 125 is reflected by the reflection mirror 103 and is received by the AF sensor module 105. An anti-reflection treatment is provided on the rear surface 103b of the reflection mirror 103 so as to intercept the light from the prism 137 when the reflection mirror 103 is in the indicia detection position "B". The pattern of the chart 133 is preferably in the form of black and white stripes.

Figure 7:
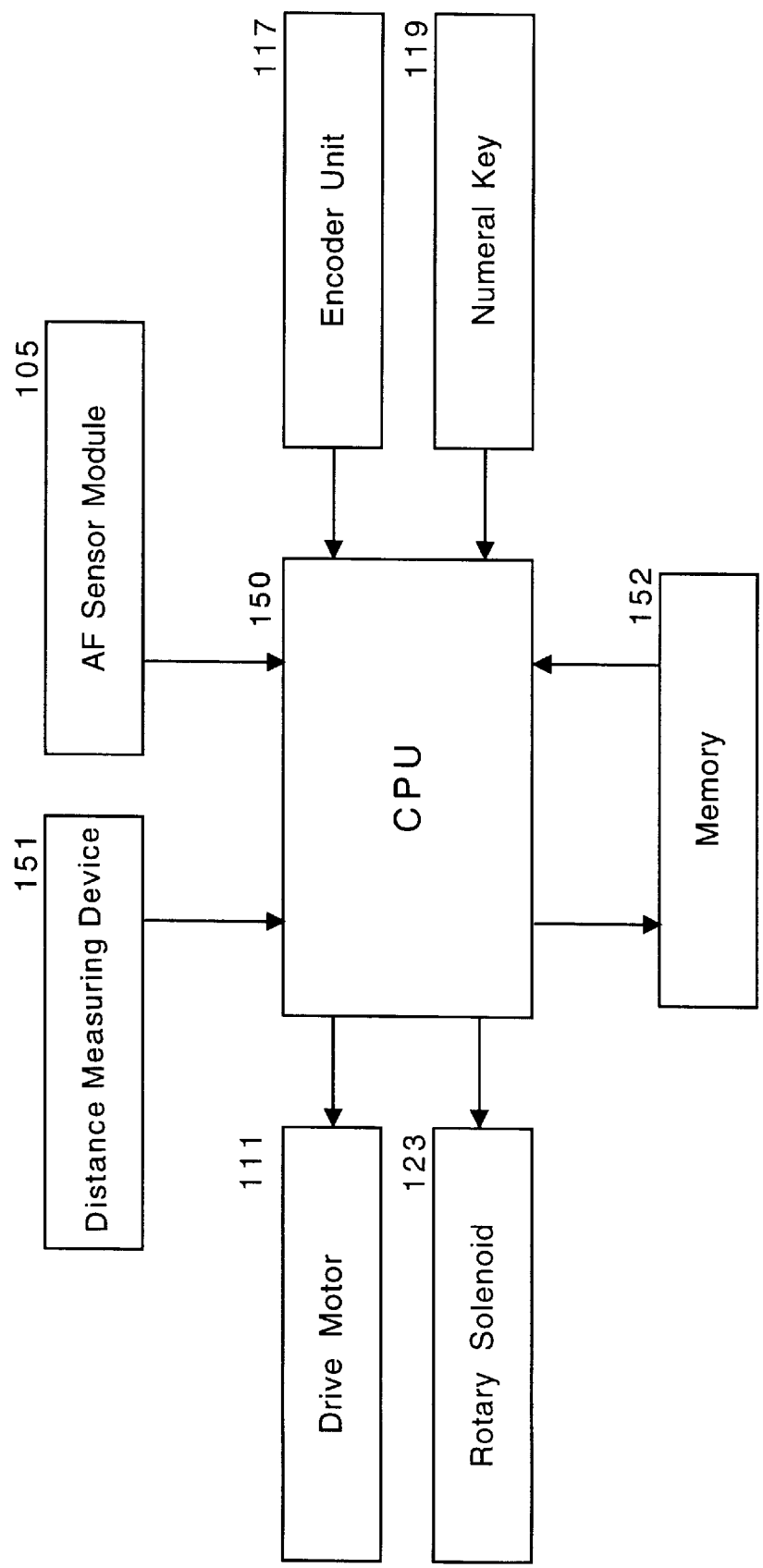
FIG. 7 is a block diagram of a controller of the total station shown in FIG. 1.

FIG. 7 shows a block diagram of a controller for a total station 101. A control board 121 (FIG. 1) is provided with a CPU 150 which controls the entire operation of the total station 101. The CPU 150 controls and drives the drive motor 111 and the rotary solenoid 123. The data detected by the AF sensor module 105 is input to the CPU 150. The encoder unit 117 detects the amount of rotation of the drive motor 111 and inputs the detection data to the CPU 150. The total station 101 includes a distance measuring device (object-distance determining device) 151, per se known, which measures the distance of the targeted object; whereas the AF sensor module 105 detects the focus state (defocus amount) on the reference focal plane 127. There are numeral keys (shown in FIGS. 1 and 6) 119 provided externally on the total station 101. It is possible to manually input the targeted-object distance, etc., using the numeral keys 119, in place of the measurement data produced by the distance measuring device 151. In other words, in the total station 101, there are two different ways for determining the object distance (the distance measuring device 151 and the numeral keys 119). Furthermore, a memory 152 is connected to the CPU 150.

In an auto-focus mode in which a normal targeted object is detected, the reflection mirror 103 is in the position "A" in which the AF sensor module 105 receives the light transmitted through the objective lens 107 and split by the prism 137 of the Porro prism 135 to detect the focus state (defocus amount) on the reference focal plane 127. If the defocus amount is not below a predetermined tolerance, the CPU 150 drives the drive motor 111 to move the focusing lens group 115 to thereby perform the focusing operation. In this operation, the position of the focusing lens group 115 is controlled based on the amount of rotation of the drive motor 111 detected by the encoder unit 117. The auto-focusing operation is completed when the defocus amount is reduced to be below the tolerance. In the normal auto-focus operation as mentioned above, since the image is in focus when the focusing lens group 115 is moved by a displacement corresponding to the defocus amount, it is not necessary to detect an absolute position of the focusing lens group 115.

However, if the auto-focus mechanism cannot perform a precise auto-focusing operation by detecting defocus amount of an targeted object, for example, if the targeted object is a prism, automatic focusing operation is carried out based on the measurements (object distance values) obtained using the distance measuring device 151. In this solution, it is necessary to detect an absolute position of the focusing lens group 115 so that the distance of the targeted object is correlated with the position of the focusing lens group 115 in which the targeted object is in focus.

The targeted-object distance value can be manually input via the numeral keys 119 or pre-stored in the memory 152, in place of the measurement data produced by the distance measuring device 151. In such a case, it is necessary to detect an absolute position of the focusing lens group 115 in order to carry out the focusing operation, similar to the case using the distance measuring device 151.

If it is necessary to move the focusing lens group 115 to an in-focus position corresponding to a set object distance which is obtained by the distance measuring device 151, which has been manually input via the numeral keys 119, or which is pre-stored in the memory 152, the position of the focusing lens group 115 is detected as follows:

Initially, the reflection mirror 103 is moved to the position "B" by the rotation of the rotary solenoid 123. Thereafter, the positions of the images of the chart 133 of the indicia plate 125 connected to the focusing lens group 115 through the pin 113, wherein the images are formed on the CCD sensors, are detected by the AF sensor module 105. The CPU 150 multiplies the deviation of the detected image positions from the position of the image formed on the AF sensor module 105, when the object image is on the reference focal plane 127, by a displacement of the object for a unit deviation on the pair of CCD sensors to obtain the distance L (L=a+b) between the indicia plate 125 and the reference focal plane 127 wherein "a" represents the distance between the indicia plate 125 and the reflection mirror 103 and "b" represents the distance between the reflection mirror 103 and the reference focal plane 127. Note that although the reference focal plane 127 is positioned outside of the AF sensor module 105 (focus detection device), the distance between the reference focal plane 127 and the AF sensor module 105 is fixed. Accordingly, the distance L effectively represents the distance from the indicia member (indicia plate 125) to the focus detection device (AF sensor module 105).

Note that the distance from the indicia plate 125 to the AF sensor module 105 (or to be precise, the reference focal plane 127) when the focusing lens group 115 is in an in-focus position corresponding to the set object distance, is referred to as an in-focus distance L'.

Consequently, the angular displacement of the motor 111 is obtained based on a difference between the current distance L and the in-focus distance L' corresponding to the set object distance so that the drive motor 111 is rotated by the angular displacement. The detection by the AF sensor module 105 and the movement of the focusing lens group 115 by the drive motor 111 are repeated until the distance L is identical to the in-focus distance L', under the control of the CPU 150. As a result, the focusing lens group 115 is moved to the in-focus position corresponding to the set distance value.

From the above discussion, the CPU 150 can be referred to as a distance determination device for determining the distance between the indicia plate 125 and the focus detection device (reference focal plane 127) in accordance with the detection result of the AF sensor module 105, when the reflection mirror 103 is in the indicia detection position "B". Furthermore, the CPU 150 operates as a controller that controls the drive motor 111 so as to move the focusing lens group 115 to the in-focus position, in accordance with the amount of defocus of the telescopic optical system when the reflection mirror 103 is in the focus detection position "A", and in accordance with the relationship between the in-focus distance L' and the distance L when the reflection mirror 103 is in the indicia detection position "B".

The distance of the targeted object and the position of the focusing lens group 115 when the telescopic optical system is in-focus state for the targeted object, i.e., the object distance and the in-focus distance L', correspond to each other. The relationship between the object distance and the in-focus distance L' is preset and stored in the memory 152 in the control board 121 or is calculated in the CPU 150 in accordance with a predetermined formula. In the latter case, the CPU 150 operates as a calculation device for determining the in-focus distance L' based on the set object distance.

Consequently, if the object distance is determined by using the distance measuring device 151 or the numeral keys 119, the in-focus distance L' can be determined. Further, if the in-focus distance L is determined, the focusing lens group 115 can be moved to the in-focus position based on the difference between the in-focus distance L' and the distance L, as mentioned the above.

Figure 8:
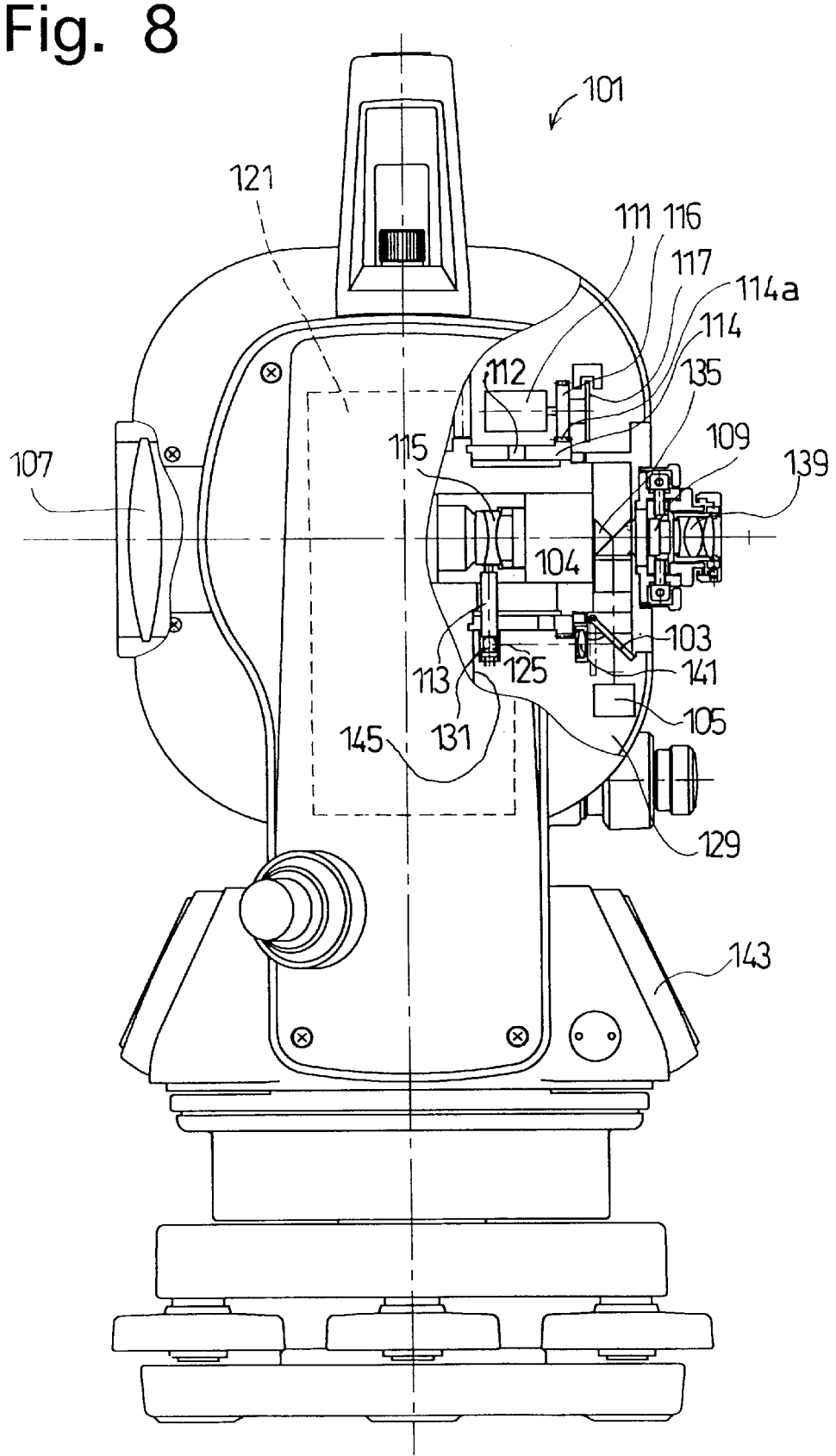
FIG. 8 is a partial sectional view of an auto-focus total station in which a relay lens is added to detect the position of the focusing lens group.
Figure 9:
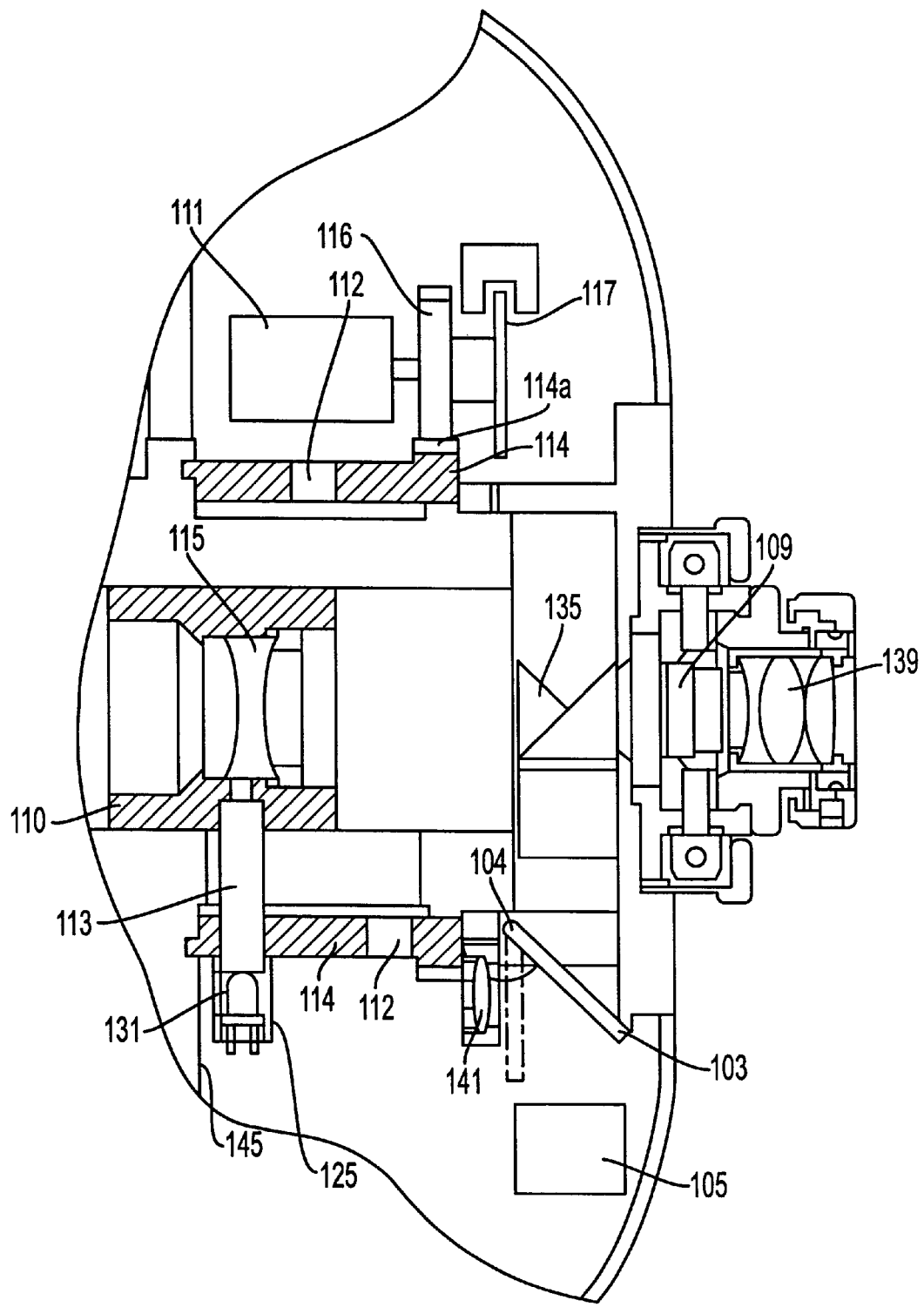
FIG. 9 is an enlarged view of a portion of the auto-focus total station shown in FIG. 8.

If the focusing lens group 115 and accordingly the indicia plate 125 is distant from the reflection mirror 103 so that the AF sensor module 105 cannot detect the distance L, it is possible to provide a distance adjusting optical element, such as a relay lens 141, as shown in FIG. 8. FIG. 9 shows an enlarged view of a portion of FIG. 8. In the arrangement shown in FIGS. 8 and 9, how the distance Q from the indicia plate 125 to the reference focal plane 127 is obtained will be described hereinafter.

Figure 10:
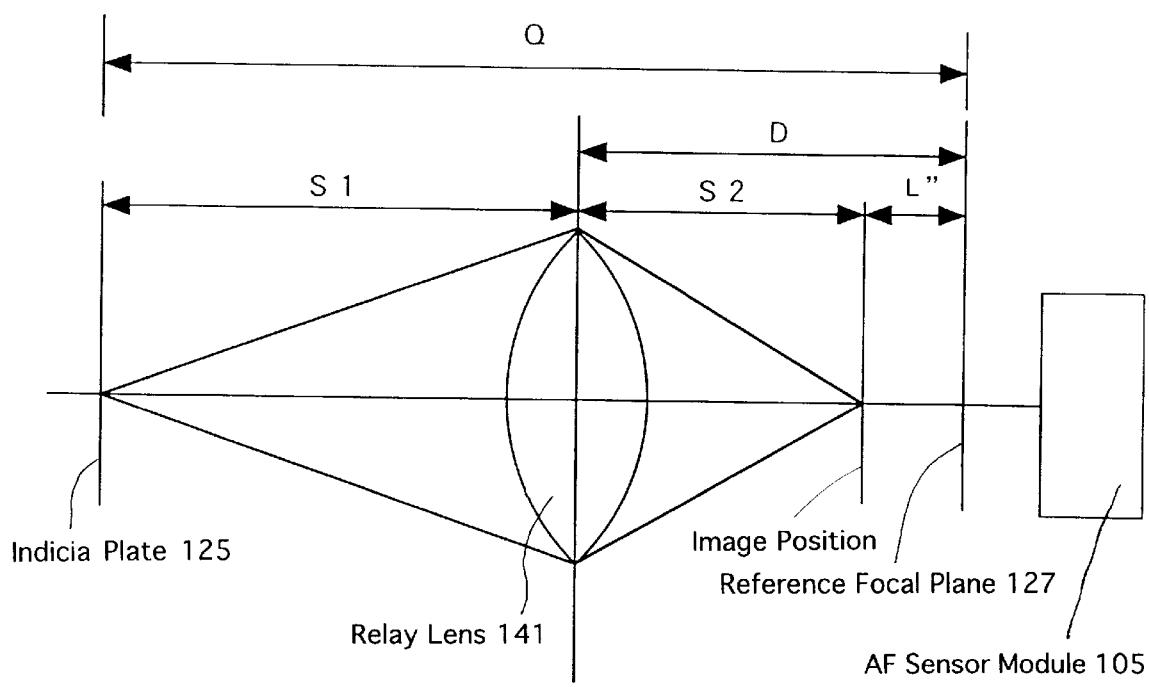
FIG. 10 is a schematic view of a light path between an indicia plate and an AF sensor module in an arrangement in which the relay lens is added.

FIG. 10 shows a light path from the indicia plate 125 to the AF sensor module 105 in the arrangement in which the relay lens 141 is added. S1 represents the distance from the indicia plate 125 to the center of the relay lens 141 and S2 represents the distance from the center of the relay lens 141 to the image position. The distances S1, S2 and the focal length f of the relay lens 141 satisfy the following relationship:

$$1/S2 = 1/S1 + 1/f \qquad (1).$$

Furthermore, the distance L" from the image position to the reference focal plane 127 and the distance S2 satisfy the following formula:

$$L'' = D - S2 \qquad (2);$$

wherein D represents the distance between the relay lens 141 and the reference focal plane 127. Note that the distance L" can be obtained in accordance with the detection result of AF sensor module 105.

From the expressions (1) and (2), Si can be obtained. The distance Q is a sum of S1 and D. The distance Q is treated in the same way as L (L=a+b) mentioned above to determine the absolute position of the focusing lens group 115. Consequently, if the relationship between the distance of the targeted object and the distance Q at which the optical system is focused for the object distance is prestored in the memory 152 or is calculated in accordance with a predetermined formula by the CPU 150, the focusing lens group 115 can be quickly and precisely moved to the in-focus position in accordance with the distance Q thus obtained.

As can be understood from the above-described embodiments, since the focus detection device (AF sensor module 105) for detecting the focus state of the targeted object is also used to detect the position of the focusing lens group, the focusing operation can be precisely carried out based on the object distance values obtained using the distance measuring device or manually input using the numeral keys, while detecting the position of the focusing lens group, in a short space of time. Also, there is no adverse influence of any backlash of the gears in the drive mechanism for the focusing lens group. Furthermore, the focusing lens position detecting apparatus of the embodiments is less expensive, smaller, lighter and more efficient in operation than a conventional apparatus using an optical linear encoder.

Note that, in general, the telescope 129 is optically isolated and hence, it is necessary to irradiate the indicia plate 125 with illumination light. For this reason, in the above-mentioned embodiments, the indicia plate 125 is transparent and a light emitter (lighting device) 131 is provided behind the indicia plate 125. The light emitter 131 can be made of a light emitting diode (LED). Moreover, the behind of the indicia plate 125 is a plain wall 145, so that if light reflected by the rear wall (i.e., the plain wall 145) of the light emitter 131 is incident upon the AF sensor module 105, no detection error occurs. Although the light emitter is provided behind the indicia plate 125 in the illustrated embodiment, it is possible to place the light emitter in front of the indicia plate.

Although the reflection mirror 103 is rotated between the focus detection position "A" and the indicia detection position "B" in the illustrated embodiments, it is possible to use another mechanism for moving the light path changing member (reflection mirror 103). For instance, it is possible to linearly move the reflection mirror 103 which is located in the inclined position "B" without varying the inclination angle. Namely, in FIG. 1, the reflection mirror is slid in the left direction to establish the light path of the focus detection optical system and is slid in the right direction to detect the indicia.

Although the light from the indicia 125 is reflected by the reflection mirror 103 and is received by the AF sensor module in the illustrated embodiments, it is possible to dispose the AF sensor module at a different position so that the light, for example, from the prism 137 is reflected by the reflection mirror and is received by the AF sensor module 105.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focusing lens position detection apparatus provided in an auto-focus surveying instrument that includes a telescopic optical system having a focusing lens which moves along an optical axis, a beam splitting element which splits object light transmitted through said focusing lens to produce light split from said telescopic optical system, and a focus detection device for receiving said split light from said beam splitting element, said focusing lens position detection apparatus comprising:

an indicia member provided on said focusing lens, which is located outside the light path of said telescopic optical system; and a light path changing member provided between said beam splitting element and said focus detection device;

a moving device which moves said light path changing member between a first position in which the split beam from said beam splitting element can be received by said focus detection device, and a second position in which the light from said indicia member can be received by said focus detection device.

2. A focusing lens position detection apparatus according to claim 1, wherein said light path changing member comprise s a reflection surface;

wherein a light path from said beam splitting element to said focus detection device is established at said first position of said light path changing member; and wherein the light path from said beam splitting element to said focus detection device is interrupted at said second position of said light path changing member, so that the light from said indicia member is reflected by said reflection surface and received by said focus detection device.

3. A focusing lens position detection apparatus according to claim 1, wherein said light path changing member is rotatable about a shaft provided at one end thereof to move between said first and second positions.

4. A focusing lens position detection apparatus according to claim 1, wherein the amount of defocus of said telescopic optical system is detected by said focus detection device when said light path changing member is in said first position.

5. A focusing lens position detection apparatus according to claim 1, further comprising a distance determination device for determining the distance between said indicia member and said focus detection device in accordance with the detection result of said focus detection device, when said light path changing member is in said second position.

6. A focusing lens position detection apparatus according to claim 5, wherein the distance of a targeted object and the distance between said indicia member and said focus detection device, when said focusing lens is placed in the in-focus position for the targeted object, are correlated.

7. A focusing lens position detection apparatus according to claim 6, comprising a memory for storing therein a correlation between the distance of the targeted object and the distance from said indicia member to said focus detection device when said focusing lens is placed in the in-focus position for the targeted object.

8. A focusing lens position detection apparatus according to claim 6, comprising a calculation device for determining the distance between said indicia member and said focus detection device which corresponds to the in-focus position of said focusing lens for focusing on the targeted object, based on the distance of the targeted object.

9. A focusing lens position detection apparatus according to claim 6, further comprising a lens moving device for moving said focusing lens to the in-focus position, based on the difference between the current distance from said indicia member to said focus detection device which is determined via the detection result of said focus detection device, and distance from said indicia member to said focus detection device which is corresponds to the in-focus position of said focusing lens for focusing on the targeted object.

10. A focusing lens position detection apparatus according to claim 1, further comprising an optical element between said indicia member and said light path changing member, for forming an image of an indicia of said indicia member.

11. A focusing lens position detection apparatus according to claim 10, wherein said optical element comprises a relay lens.

12. A focusing lens position detection apparatus according to claim 1, further comprising a lighting device for illuminating said indicia member.

13. A focusing lens position detection apparatus according to claim 12, wherein said lighting device is located on the side opposite to said light path changing member with respect to said indicia member and in the vicinity of said indicia member.

14. A focusing lens position detection apparatus according to claim 13, wherein said indicia member is transparent.

15. A focusing lens position detection apparatus according to claim 12, wherein when said light path changing member is in said second position, said lighting device being activated to irradiate illumination light.

16. An auto-focus surveying apparatus comprising:

a telescopic optical system having a focusing lens which moves along an optical axis;

a beam splitting element which splits object light transmitted through said focusing lens to produce light split from said telescopic optical system;

a focus detection device, which receives the split light from said beam splitting element and detects the amount of defocus of said telescopic optical system;

an object-distance determining device, which obtains the distance of a targeted object;

a lens moving device for moving said focusing lens;

an indicia member provided on said focusing lens, which is located outside the light path of said telescopic optical system;

a light path changing member provided between said beam splitting element and said focus detection device, which is movable between a first position in which the split beam from said beam splitting element can be received by said focus detection device so as to detect the amount of defocus of said telescopic optical system, and a second position in which the light from said indicia member can be received by said focus detection device;

a distance determination device for determining the distance between said indicia member and said focus detection device in accordance with the detection result of said focus detection device, when the light from said indicia member is received by said focus detection device; and a controller that controls said lens moving device so as to move said focusing lens to the in-focus position, in accordance with the amount of defocus of said telescopic optical system when said light path changing member is in said first position, and in accordance with the relationship between said targeted-object distance and said distance from said indicia member to said focus detection device when said light path changing member is in said second position.

* * * * *